United States Patent
Bailey

(10) Patent No.: US 7,831,724 B2
(45) Date of Patent: Nov. 9, 2010

(54) SERVICES LAYER MODEL FOR PROVIDING STANDARDS-BASED COMMUNICATIONS

(75) Inventor: Eddie L. Bailey, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1176 days.

(21) Appl. No.: 10/852,837

(22) Filed: May 25, 2004

(65) Prior Publication Data

US 2005/0267979 A1    Dec. 1, 2005

(51) Int. Cl.
   *G06F 15/16* (2006.01)
(52) U.S. Cl. .................................... 709/230
(58) Field of Classification Search ......... 709/227–229, 709/230, 250
   See application file for complete search history.

(56) References Cited

U.S. PATENT DOCUMENTS

| | | | |
|---|---|---|---|
| 2002/0069267 A1 | 6/2002 | Thiele | |
| 2002/0108484 A1* | 8/2002 | Arnold et al. | 84/615 |
| 2002/0191774 A1* | 12/2002 | Creamer et al. | 379/230 |
| 2002/0198734 A1 | 12/2002 | Greene et al. | |
| 2003/0037174 A1 | 2/2003 | Lavin et al. | |
| 2003/0177281 A1* | 9/2003 | McQuillan et al. | 709/320 |
| 2003/0181193 A1 | 9/2003 | Wilhelmsson et al. | |
| 2003/0191677 A1 | 10/2003 | Akkiraju et al. | |
| 2003/0193994 A1* | 10/2003 | Stickler | 375/150 |
| 2004/0064821 A1* | 4/2004 | Rousselle | 719/310 |
| 2005/0137833 A1* | 6/2005 | Sistla | 702/188 |
| 2005/0246722 A1* | 11/2005 | Shier et al. | 719/321 |

OTHER PUBLICATIONS

Bailey, E., "Carrier Grade Open Framework—Overview", Version 1.0, IBM Corporation, Feb. 1, 2004.

* cited by examiner

*Primary Examiner*—Benjamin R Bruckart
*Assistant Examiner*—Scott M Sciacca
(74) *Attorney, Agent, or Firm*—Novak Druce + Quigg

(57) ABSTRACT

An open communications framework including an application layer that defines standards for applications, a middleware layer that defines standards for middleware, an operating system layer that defines standards for operating systems, and a hardware layer that defines standards for hardware. Interface layers based upon open-standards can be used to communicate data between the application layer and the middleware layer, between the middleware layer and the operating system layer, and between the operating system layer and the hardware layer.

11 Claims, 1 Drawing Sheet

100

| Application 120 | Network Applications | | | | | | |
|---|---|---|---|---|---|---|---|
| Application Services 122 | Protocol Services | | Management/ OAM&P Application Services | | | Telecom Application Services | |
| Middleware 124 | Signaling Protocol Stacks | Gateway Protocol Stacks | Parlay Gateway | Parlay Integration | OAM&P Middleware | Database Middleware | Portals J2EE/ Web Services Middleware |
| Platform Services 126 | IP Workload Management Services | | CORBA Services | SM Services | | DM Services | JAVA JDBC |
| | HA / Cluster Messaging Services | | | | | | |
| Operating System 128 | Carrier Grade OS Enhancements | | | | | | |
| | Standard and Embedded Operating Systems | | | | | | |
| Hardware Services 130 | RAID SCSI | ASIC, HW Acceleration | | Device Drivers | | Firmware HW Management | |
| Hardware 132 | Storage | I/O Adaptors | | Network Cards | | Processor / Memory | |

FIG. 1

SERVICES LAYER MODEL FOR PROVIDING STANDARDS-BASED COMMUNICATIONS

BACKGROUND

1. Field of the Invention

The present invention relates to the field of communications and, more particularly, to a model for an open communications network.

2. Description of the Related Art

The rapidly changing communications environment has resulted in substantive changes in how technology capital and operational resources are allocated. Broadband technology is fundamentally changing the traditional business models followed by providers of wireline, wireless, and data network services. This change in technology and business models, combined with a gradual shift in consumer behavior, is leading to a new era of business challenges and opportunity for service providers (SPs). During this period of transition, SPs are intensely focused on reducing costs and improving process efficiency, which sets the operational foundation and economic model for new revenue generating services.

As pressure on voice services revenue increases, SPs may choose to address the significant expenses associated with network components. Still, the network is under scrutiny not just as a result of the expenses, but also because of the important role the network plays in enabling new and innovative value-added services, which is another method used to attract customers within a highly competitive marketplace. A combination of pressures to reduce expenditures and enhance features has resulted in a desire for SPs to shift from proprietary, switch based communication models to models based upon standardized components. Many believe that a standards-based, open communication infrastructure can reduce the cost of providing communications services while increasing the flexibility of communication networks. Optimally, a standards-based, open communication infrastructure would be a distributed, heterogeneous network that permits the usage and integration of various commercial off the shelf (COTS) communication solutions.

Unfortunately, SPs and providers of telephony services have not been able to agree upon a common set of standards-upon which to construct such a standards-based, open communication infrastructure. Groups defining open communication standards and venders offering COTS technologies have grown along divergent paths. That is, most such standards groups and technology venders operate independently from one another when specifying standards and developing technology. These groups rarely focus on more than one layer or component of a total solution framework, resulting in gaps and overlaps that solution integrators must resolve. Accordingly, the resulting network solutions constructed by integrators can be tightly integrated, closed systems including proprietary, non-standardized integration code and/or techniques. As a result, it can be difficult for SPs to construct a flexible, platform independent, product independent solution that integrates COTS technologies in a timely fashion.

SUMMARY OF THE INVENTION

The present invention provides a method, a system, and an apparatus for a services layer model for providing standards-based, open communications in accordance with an embodiment of the inventive arrangements disclosed herein. In one embodiment, three specific service layers, a modular hardware service layer, a platform services layer, and an application services layer, can interoperate to establish and maintain relationships among distributed, communication components. Solution integrators can utilize these service layers to properly position and map various communication standards and COTS technology to eliminate gaps and overlaps, thereby facilitating the construction of communication solutions in a modular fashion. That is, the present invention can establish boundaries between communication components that are common across nodes, thereby allowing communication components to be integrated in a uniform fashion to create customized communication solutions.

Because the present invention can improve the integration of open standards, open source software, and commercially available components into service providers' network delivery platforms (such as call control, switching, and network element management), the present invention can simplify the delivery of multi-vendor services, content, and applications. Further, the present invention can allow service providers to design, develop, and deliver lower cost and time-to-market, value-added enhancements to services. The present invention can also facilitate a successful transition from inflexible, proprietary communication solutions to next generation network (NGN) infrastructures.

One aspect of the present invention can include a communications framework including an application layer that defines standards for applications, a middleware layer that defines standards for middleware, an operating system layer that defines standards for operating systems, and a hardware layer that defines standards for hardware. Interface layers based upon open-standards can be used to communicate data between the application layer and the middleware layer, between the middleware layer and the operating system layer, and between the operating system layer and the hardware layer.

BRIEF DESCRIPTION OF THE DRAWINGS

There are shown in the drawings, embodiments that are presently preferred; it being understood, however, that the invention is not limited to the precise arrangements and instrumentalities shown.

FIG. 1 is a schematic diagram illustrating a communication framework 100 in accordance with an embodiment of the inventive arrangements disclosed herein.

DETAILED DESCRIPTION OF THE INVENTION

FIG. 1 is a schematic diagram illustrating a communication framework 100 in accordance with an embodiment of the inventive arrangements disclosed herein. The framework 100 details a hardware-independent architecture for the telecommunications industry that can be used as a basis for new componentized solution developments. The framework 100 specifies functional components capable of creating Next Generation Network (NGN) solutions, the relationship of those components to each other, as well as the interfaces between the components.

The framework 100 can define a layered network architecture that utilizes open standard interfaces to communicate between layers. The framework 100 can include an application layer 120, an application services layer 122, a middleware layer 124, a platform services layer 126, an operating system layer 128, a hardware services layer 130, and/or a hardware layer 132. The application layer 120 can contain solution specific telecommunication applications. The applications of the application layer 120 can be written in a fashion independent of network structures.

The application services layer 122 can be a layer of abstraction between the application layer 120 and the middleware layer 124. The application services layer 122 can include a plurality of open and technology independent interfaces like application program interfaces (API) between the application layer and the middleware layer 124. Accordingly, the application services layer 122 can hide specific network control differences of middleware solutions from the applications. Consequently, the same application can access multiple network infrastructures, such as internet protocol (IP), Global System for Mobile Communications (GSM), Third-Generation protocols (3G), Code Division Multiple Access (CDMA), Time Division Multiple Access (TDMA), wireline, other packetized network structures, and/or the like, by utilizing different APIs of the application services layer 122.

The application services layer 122 can include protocol services, operation, administration, maintenance, and provisioning (OAM&P) services, and/or telecommunication application services. The application services layer 122 can utilize any of a multitude of different open interface standards and is not limited in this regard. For example, the standards used by the application services layer 122 can include, but are not limited to, Open Mobile Alliance (OMA), Parlay, Open Systems Architecture (OSA), Second Generation Partnership Program (2GPP), Third Generation Partnership Program (3GPP), International Telecommunications Union (ITU), Signaling Transport (SIGTRAN), Session Initiation Protocol (SIP), Media Gateway Control Protocol (MGCP), Stream Control Transmission Protocol (SCTP), Universal Description, Discovery and Integration (UDDI), Simple Object Access Protocol (SOAP), eXtensible Markup Language (XML), Lightweight Directory Access Protocol (LDAP), Interface Definition Language (IDL), Web Services Description Language (WSDL), and/or the like.

The middleware layer 124 can facilitate some aspect of cooperative processing. Middleware within the middleware layer 124 can include network-aware software for directory services, message-passing mechanisms, distributed transaction (workload) processing monitors, object request brokers, remote procedure call (RCP) services, database gateways, and/or the like. Specifically, the middleware layer 124 cap include, but is not limited to, signaling protocol stacks, gateway protocol stacks, parlay gateway components, parlay integration components, OAM&P middleware components, database middleware, portals, Web services middleware, Java 2 Enterprise Edition (J2EE) middleware, and/or the like.

The platform services layer 126 can provide security services, program distribution, database services, messaging services, and/or the like. Accordingly, the platform services layer 126 can function as a layer of abstraction between the middleware layer 124 and the operating system layer 128. Further, communication nodes adhering to the framework 100 can exchange data with one another via the platform services layer 126.

The platform services layer 126 can provide Common Object Request Broker Architecture (CORBA) services, Security Intelligence and System Modeling (SM) services, Data Modeling (DM) services, Java Database Connectivity (JDBC) services, and/or the like. More specifically, the platform services 126 can provide services supporting, but not limited to, Application Interface Specification (AIS), Common Object Request Broker Architecture (CORBA), Remote Method Invocation/Internet Inter-ORB Protocol (RMI/IIOP), Simple Network Management Protocol (SNMP), JAVA, Carrier Grade Linux (CGL), Open Cluster Framework (OCF), Portable Operating System Interface (POSIX), and/or the like.

The operating system layer 128 can include software responsible for allocating system resources including memory, processor time, disk space, and peripheral devices such as network interface cards, and/or the like. The operating systems within the operating system layer 128 can include carrier grade operating system enhancements as well as standard and embedded operating systems. Examples of carrier grade operating system enhancements can include, but are not limited to, improved resource locking, heartbeat timers, hardened device drivers, low latency file systems, soft realtime task scheduling, high performance process threading, and/or the like.

The hardware services layer 130 can be a layer of abstraction between the operating system 128 and the hardware layer 132. The hardware services layer 130 can include storage protocols, device drivers, firmware, hardware management routines, hardware acceleration applications, and/or the like. For example, the hardware services layer 130 can manage one or more Redundant Array of Independent Disks (RAID), Small Computer System Interface (SCSI) devices, Application-Specific Integrated Circuit (ASIC) devices, and/or the like. Standards supported by the hardware services layer 130 can include, but are not limited to, Hardware Platform Interface (HPI), Intelligent Platform Management Interface (IPMI), Storage Management Initiative Specification (SMI-S), and/or the like.

The hardware layer 132 can include the mechanical and electrical parts of a computer system such as components for storage, input/output adaptors, network cards, processors, memory, circuit boards, peripheral devices, and/or the like.

It should be noted that framework 100 allows communication solutions to be constructed using modular, platform-independent components, where each component can be utilized as though it were a black box or a commodity, where the implement details are hidden or abstracted. Consequently, the usage of COTS components and re-use and sharing of previously constructed components is facilitated through the open standards specified for the framework 100.

Components within each of the application layer 120, the middleware layer 124, the operating system layer 128, and hardware layer 132 need not be aware of implementation details pertaining to components contained within other ones of these layers. All component integration and information exchanges can occur via the services layers. That is, the application services layer 122 can integrate application layer 120 components with middleware layer 124 components; the platform services layer 126 can integrate middleware layer 124 components with operating system layer 128 components; and, the hardware services lawyer 130 can integrate operating system layer 128 components with hardware layer 132 components.

It should be appreciated that framework 100 services layers can enable a communication service on multiple access, application, and/or data platforms across a distributed communications infrastructure. Additionally, access platforms can utilize gateway protocols to identify and authorize connections to the communications infrastructure. Accordingly, the access platforms can be placed closer in proximity to the location of the user and device. Moreover, application platforms utilizing signaling protocols and J2EE services can be located adjacent to core switching and routing to direct bearer traffic. Further, data platforms utilizing multiple memory resident and disk resident databases can better organize content based upon origin, type and destination. Notably, by adhering to framework 100, the specific components for the three platform types could be developed, deployed, and managed as a single logical service delivery platform by the service provider.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for providing communications services using a services layer model for providing standards-based, open communications in a communications framework comprising:

providing a communications framework having a hardware-independent architecture with a services layer model, the communications framework specifying functional components capable of creating Next Generation Network (NGN) solutions, relationship of the components to each other, and interfaces between the components, the communications framework defining a layered network architecture that utilizes open standard interfaces to communicate between layers, the communications framework including:
an application layer configured for solution specific telecommunication applications;
an application services layer;
a middleware layer configured for middleware;
a platform services layer;
an operating system layer configured for a plurality of operating systems;
a modular hardware services layer; and
a hardware layer configured for a plurality of mechanical and electronic parts; and
providing communications services using the services layer model;
wherein the services layers are provided based upon open-standards to communicate data between the application layer and the middleware layer, between the middleware layer and the operating system layer, and between the operating system layer and the hardware layer;
wherein the services layers integrate open standards, open source software, and commercially available components into service providers' network delivery platforms so as to enable the delivery of multi-vendor services, content, and applications;
wherein the services layers interoperate to establish and maintain relationships among distributed, communication components so that solution integrators can utilize these service layers to properly position and map various communication standards and various commercial off the shelf (COTS) communication solutions to eliminate gaps and overlaps, thereby enabling the construction of communication solutions in a modular fashion;
wherein the application services layer is a layer of abstraction between the application layer and the middleware layer and is configured to include a plurality of open-standard and technology independent interfaces, each interface for communicating information between applications in the application layer and middleware in the middleware layer, so that a same application can access multiple network infrastructures, wherein services specified by the application services layer comprise protocol services, OAM&P services, and telecommunication application services;
wherein the platform services layer is a layer of abstraction between the middleware layer and the operating system layer and is configured for a plurality of open-standard interfaces, each interface for communicating information between middleware in the middleware layer and operating systems in the operating system layer, wherein services specified by the platform services layer comprise IP workload management services, security intelligence and system modeling services, database modeling and connectivity services, and messaging services;
wherein the hardware services layer is a layer of abstraction between the operating system layer and the hardware layer and is configured for a plurality of open-standard interfaces, each interface for communicating information between operating systems in the operating system layer and hardware in the hardware layer, wherein services specified by the hardware services layer comprise storage services, hardware acceleration services, device drivers, firmware services, and hardware management services; and
wherein the operating system layer comprises carrier grade operating system enhancements including at least one of improved resource locking, heartbeat timers, hardened device drivers, low latency file systems, soft realtime task scheduling, and high performance process threading.

2. The method of claim 1, wherein at least one open standard is specified by the application layer to which applications of the application layer conform, and wherein at least one open standard is specified by the middleware layer to which middleware of the middleware layer conforms, and wherein at least one open standard is specified by the operating system layer to which operating systems of the operating system layer conforms, and wherein at least one open standard is specified by the hardware layer to which hardware of the hardware layer conforms.

3. The method of claim 1, wherein the middleware layer comprises signaling protocol stacks, gateway protocol stacks, parlay gateway components, parlay integration components, operation, administration, maintenance, and provisioning (OAM&P) middleware components, database middleware, and Web services middleware.

4. The method of claim 1, wherein the operating system layer further comprises standard computer operating systems and embedded operating systems.

5. The method of claim 1, wherein the hardware layer comprises components for storage, input/output adaptors, network components, processors, and memory.

6. The method of claim 1, wherein the open standard interfaces of the application services layer comprise at least one standard selected from the group consisting of Open Mobile Alliance (OMA), Parlay, Open Systems Architecture (OSA), Second Generation Partnership Program (2GPP), Third Generation Partnership Program (3GPP), International Telecommunications Union (ITU), and Signaling Transport (SIGTRAN).

7. The method of claim 1, wherein the open standard interfaces of the application services layer comprises at least one standard selected from the group consisting of Session Initiation Protocol (SIP), Media Gateway Control Protocol (MGCP), Stream Control Transmission Protocol (SCTP), Universal Description, Discovery and Integration (UDDI), and Lightweight Directory Access Protocol (LDAP).

8. The method of claim 1, wherein the open standard interfaces of the application services layer comprises at least one standard selected from the group consisting of Simple Object Access Protocol (SOAP), eXtensible Markup Language (XML), Interface Definition Language (IDL), and Web Services Description Language (WSDL).

9. The method of claim 1, wherein the open standard interfaces of the platform services layer comprises at least one standard selected from the group consisting of Application Interface Specification (AIS), Carrier Grade Linux(CGL), and Open Cluster Framework (OCF), and Portable Operating System Interface (POSIX).

10. The method of claim 1, wherein the open standard interfaces of the platform services layer comprises at least one standard selected from the group consisting of Common Object Request Broker Architecture (CORBA), Remote Method Invocation/Internet Inter-ORB Protocol (RMI/IIOP), Simple Network Management Protocol (SNMP), and JAVA.

11. The method of claim 1, wherein the open standard interfaces of the hardware services layer comprises at least one standard selected from the group consisting of Hardware Platform Interface (HPI), Intelligent Platform Management Interface (IPMI), and Storage Management Initiative Specification (SMI-S).

* * * * *